United States Patent [19]

Fränzl

[11] 4,083,386
[45] Apr. 11, 1978

[54] MANUFACTURE OF PRIMARY CELLS

[75] Inventor: Alois Fränzl, Ellwangen, Jagst, Germany

[73] Assignee: Varta Batterie Aktiengesellschaft, Germany

[21] Appl. No.: 625,198

[22] Filed: Oct. 23, 1975

Related U.S. Application Data

[63] Continuation-in-part of Ser. No. 470,863, May 17, 1974, Pat. No. 3,958,612.

[30] Foreign Application Priority Data

May 24, 1973 Germany .............................. 2326460
Nov. 18, 1974 Germany .............................. 2454542

[51] Int. Cl.² .............................................. B65B 1/04
[52] U.S. Cl. .................................... 141/12; 141/73
[58] Field of Search ................. 141/12, 1, 11, 81, 102, 141/263, 1.1, 71, 73, 80; 136/175; 53/36, 24 D, 124 D

[56] References Cited

U.S. PATENT DOCUMENTS

| | | | |
|---|---|---|---|
| 1,570,916 | 1/1926 | De Olaneta .......................... | 136/175 |
| 2,962,844 | 12/1960 | Olando et al. ........................ | 136/175 |
| 3,386,372 | 6/1968 | Knipp ..................................... | 141/73 |

FOREIGN PATENT DOCUMENTS 866,936   3/1971   Canada .................................. 136/175

Primary Examiner—Houston S. Bell, Jr.
Attorney, Agent, or Firm—Weiser, Stapler & Spivak

[57] ABSTRACT

Battery cell cups are filled with compressed depolarizer mass by performing a plurality of mass insertion and compression strokes for each cup. In the first stroke, a mass plug remaining from the compression strokes for the preceding cup is introduced into the cell. Overdosage leaves a mass plug for the next cup.

A rotary machine performs the successive strokes at work stations spaced around the periphery. Numerous cups can be processed simultaneously by the machine.

Automatic control of stroke pressure is provided.

31 Claims, 9 Drawing Figures

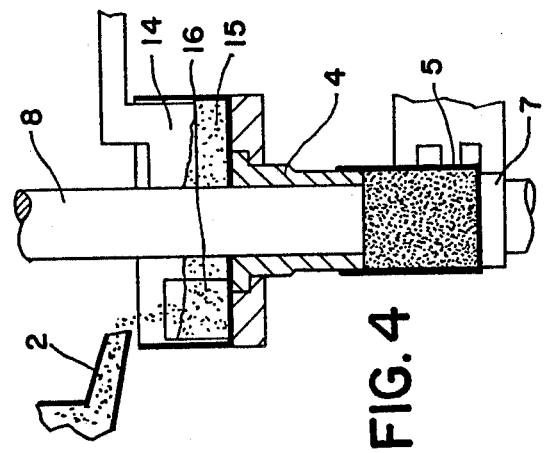
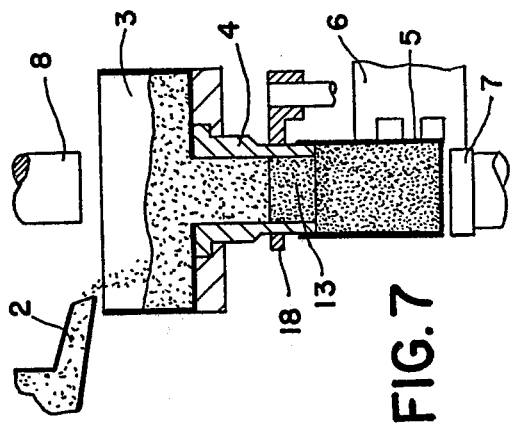
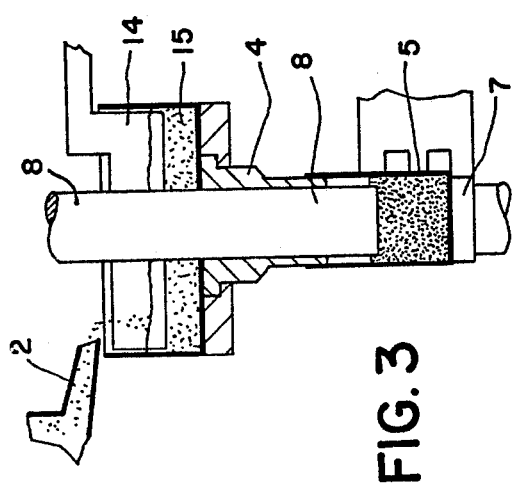
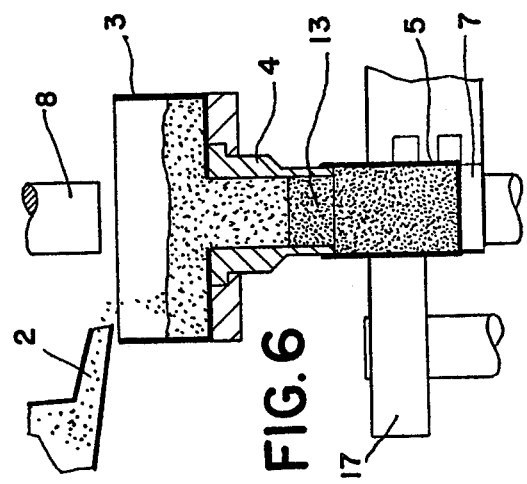
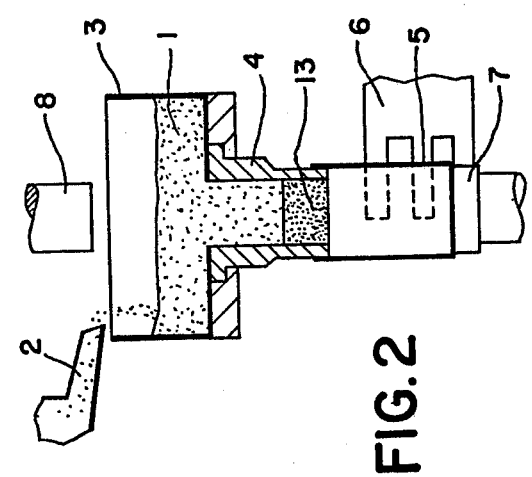
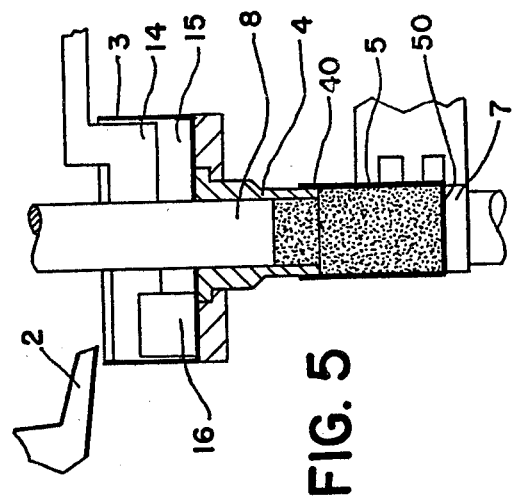

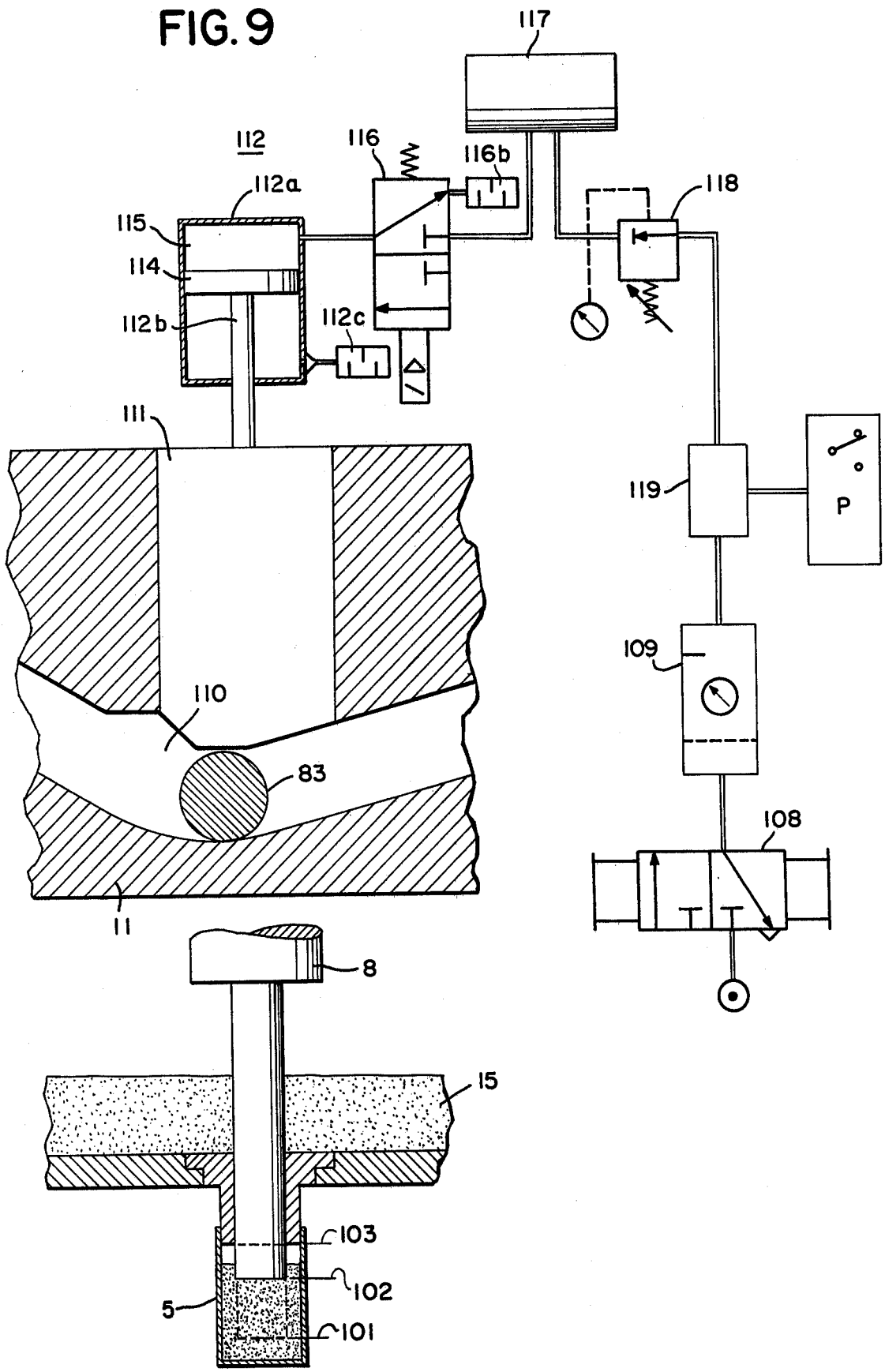

MANUFACTURE OF PRIMARY CELLS

This application is a continuation-in-part of application Ser. No. 470,863, filed May 17, 1974, now U.S. Pat. No. 3,958,612 issued May 25, 1976.

The invention relates to a method of and apparatus for manufacturing galvanic primary cells in which a nozzle is used to introduce and compress depolarizer mass in a cell cup, and in which precompressed mass is introduced by the nozzle into the next following cell cup.

It is known, in the manufacture of dry cells, to introduce the depolarizer mass through a nozzle into the cell cup. For example, in U.S. Pat. No. 2,962,844, an arrangement is disclosed in which a nozzle is inserted into the upper rim of the cell cup. To prevent escape of depolarizer mass during compression, the mouth of the cell cup is tightly sealed by the nozzle. To introduce and compress the mass, a ram is used which pushes the entire mass volume into the cell cup in a single filling operation. During this filling operation, the pressure is raised until the depolarizer mass overflows in the space between pressure ram and cylinder. A separate passage can also be provided in the nozzle for the reverse flow of the mass overflowing from the cell cup. After compression, the depolarizer press body in the cell cup is separated from the nozzle by a severing arrangement.

In U.S. Pat. No. 3,198,221 an arrangement is disclosed in which a cell cup is pushed onto the nozzle by means of a pressure spring until the nozzle is inserted almost to the bottom of the cell cup. The nozzle is connected through a pipe with the pressure ram. Both nozzle and pipe are filled with depolarizer mass prior to compression. During compression, a pressure ram pushes the depolarizer mass into the cell cup in rod shape. Through pressure of the depolarizer mass against the cell cup bottom, the cell cup and nozzle are progressively pulled away from each other. After compression, the cup is separated from the nozzle by a severing arrangement.

These known arrangements have the disadvantage that the compression density and the depolarizer electrode weight of the finished cells is subject to wide fluctuations. Only depolarizer masses of very specific structure and viscosity can be used. The mass components of manganese dioxide, carbon black and electrolyte may be varied only within very narrow limits. Consequently, the structure of the depolarizer mass cannot be readily adapted to the demands of electrochemical optimization.

In the arrangements described in the above-mentioned U.S. patents the pressure ram and nozzle are connected to each other by a pipe. The pressure of the ram is transmitted to the nozzle through the body of depolarizer mass present in the pipe. Since this depolarizer mass has a certain viscosity, a substantial pressure reduction takes place between the pressure ram and the cell bottom due to internal friction in the pipe and cell cup. A mixture of manganese dioxide, carbon black useful as the depolarizer mass may have a liquid content of 15 to 20% by weight. This is conductive to the formation of moist, sticky balls of mass, i.e., lumps. Because of nonuniform graininess of the depolarizer mass, appreciable dosage and density variations are to be anticipated in the production of depolarizer electrodes. This leads to nonhomogeneous compression density of the depolarizer electrode, this density being susceptible to decreases of between 15 and 30% from the top to the bottom of the cup. In turn, this has adverse effects upon the electrochemical conditions within the cell. Particularly undesirable conditions arise in the filling of cell cups whose diameter is exceptionally small relative to the cell cup height (Baby cell or C battery). In these, there is no assurance of any particular pressure of the depolarizer electode upon the cell bottom.

In the above-mentioned prior U.S. patent application Ser. No. 470,863 there is disclosed a technique for the production of galvanic primary cells through direct pressing of the depolarizer mass into the cup-shaped negative electrode. In that technique, a press body is pushed which extends above the cell through over dosage of the depolarizer body compressed to constant density. This body is then severed at a predetermined point within the cup and the severed portion is introduced into the next following cell cup as a mass plug and pressed together with additional depolarizer mass. A system for carrying out that process includes a fixed dosage nozzle between two axially displaceable rams. Between the nozzle and the lower ram there is a holder for receiving the cell cup and a severing arrangement. The cell cup is moved into engagement with the dosage nozzle by the lower ram. The upper ram presses the depolarizer mass into the cell cup through the nozzle. The excess mass in the nozzle is introduced into the bottom of the next following cell cup as a mass plug. This mass plug is constituted by that portion of the depolarizer pressed body which remained in the nozzle from the prior pressing operation, having been severed from the mass in the cup by rotation of the latter.

It is an object of the present invention to produce depolarizer electrodes whose weight and density can be predetermined and maintained within narrow tolerances, and to do so independently of the structure and viscosity of the depolarizer mass and at high production rates.

It is another object to provide such a technique which makes it possible to insert into the cell depolarizer mass which conforms in optimal fashion to the electrochemical conditions.

These and other objects which will appear are achieved, in accordance with the present invention, by introducing depolarizer mass into the cell cup in at least two stages and compressing same with compression force which is predetermined by means of a pressure regulator. In the first stage, a ram pushes into the cell cup prepressed mass from the nozzle as a mass plug, plus additional mass and compresses both. In the final stage, the ram pushes into the cell cup an overdose of mass and compresses it in the nozzle and the cell cup into a depolarizer press body. The portion of this depolarizer press body within the nozzle is severed from the depolarizer electrode itself, and is introduced into the next following cell cup as a mass plug.

Preferably the portion of the depolarizer press body within the nozzle is severed by rotation of the cell cup. The portion of the depolarizer press body remaining in the nozzle constitutes about 20 to 30% of the depolarizer weight. Preferably, the depolarizer mass is introduced into the cell cup in three or more stages.

Apparatus for practicing the foregoing comprises two opposingly displaceble rams between which an annular mass storage container is positioned. The rams are displaceable in a vertical direction for the compression stroke. This storage container holds nozzles which are adapted for the engagement of cell cups. The upper ram is displaceable between the mass storage container and the cell cup bottom. During the actual compression stage the upper ram is connected to a pressure regulator. The lower ram is adapted to support the cell cups. It serves to press cell cup against nozzle.

In a preferred embodiment the mass storage container has the shape of a filler ring equipped with a plurality of nozzles around its periphery. The filler ring is rotatable. Fixed cylindrical housings with guidance grooves are provided for control of the rams. Guide members attached to the rams travel in these grooves. The guidance grooves of the upper cylinder wall are interrupted by recesses which are adapted to receive axially displaceable control elements. These control elements are connected to a pressure regulator whose desired control level is adjustable in simple fashion. Before the actual pressure exerting pressure is reached the control elements connected to the pressure regulator take over the control of the upper ram. Below the filler ring a rotatable guide ring is provided with recesses for the reception of cell cups.

The following advantages are achieved by the invention:

1. Uniform density of the depolarizer mass throughout the cell cup independently of its diameter-to-height relationship.
2. Depolarizer density which is largely independent of the structure of the depolarizer material.
3. Simple control of optimum depolarizer density through predetermination of the compression pressure by means of the pressure regulator.
4. High production rate.

For further details, reference is made to the discussion which follows, in the light of the accompanying drawings wherein:

FIG. 2 shows the arrangement of FIG. 1 with the cell cup engaged on the nozzle.

FIGS. 3, 4 and 5 show the individual compression stages for filling with depolarizer.

FIG. 6 shows a severing arrangement utilizing a friction roller.

FIG. 7 shows a stripping arrangement.

FIG. 9 illustrates, in diagrammatic fashion, a preferred arrangement for regulating pressures in the arrangement of FIG. 8.

Figure 1:
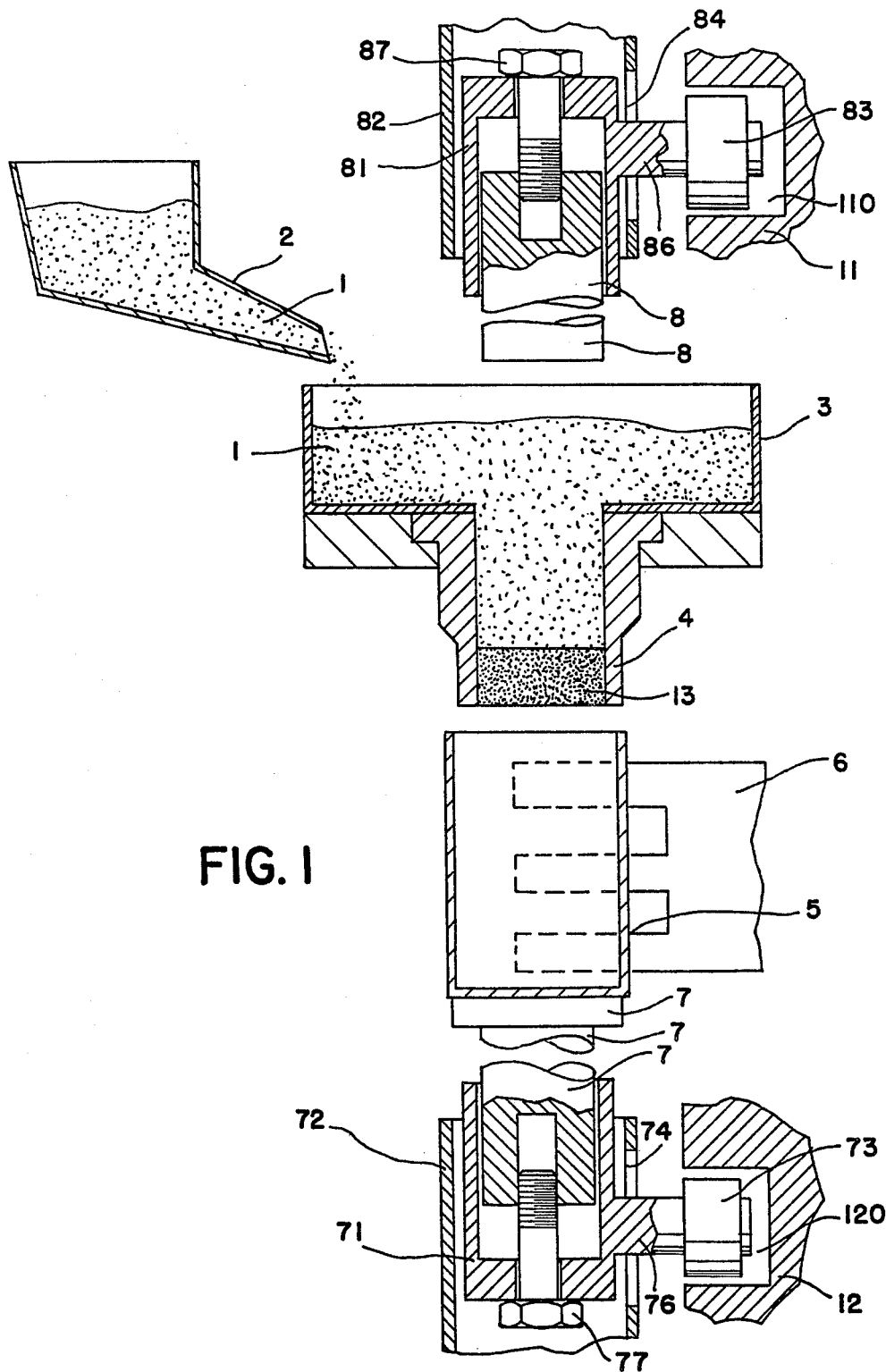
FIG. 1 shows an embodiment of the invention with a cell cup in position prior to insertion of the nozzle.

Referring to FIG. 1, which shows a cross-sectional view of an embodiment of the invention, the depolarizer mass 1 is supplied to a continuously rotating filler ring 3 through an adjustable vibratory feeder mechanism 2. The axis of rotation of the filler ring is to the right side of the figure, beyond the limits shown in the drawing. The filler ring 3 has in its lower surface nozzles 4 (of which one is shown in FIG. 1). Through these the depolarizer mass is supplied to cell cups 5 (of which there is also one shown in the figure). The cell cups are lined with a separator.

In order to fill the cell cup 5, it is set into motion by a guidance ring 6 which moves together with filler ring 3, and it is pushed against the nozzle by lower ram 7, bringing the cup mouth into engagement with the nozzle. Thereafter, lowering of upper ram 8 pushes depolarizer mass from filler ring 3 and nozzle 4 into cell cup 5, where it is compressed.

At the same time that rams 7 and 8 move continuously in a horizontal direction with filler ring and matrix, they are displaceable in vertical directions.

Rams 7 and 8 are positioned within hollow cylinders 72, 82, by means of axially displaceable guide rams 71, 81. The guide rams are provided with members 73, 83, which travel within curved guidance grooves 110, 120. Through connecting arms 76, 86, movements in axial direction are transmitted to guide rams 71, 81. The curved guidance grooves are formed by receses in fixed cylinder walls 11 and 12, which are coaxial with the axis of rotation. Long, slotted openings 74, 84, are provided in hollow cylinders 72, 82, through which the connecting arms 76, 86 protrude. Guide rams 71, 81 are connected to rams 7 and 8 through adjustable screws 77, 87.

In an embodiment of the invention, the filler ring is equipped with a plurality of nozzles, e.g., between 30 and 40. The rate of rotation may be approximately 10 to 15 revolutions per minute.

The filling process is subdivided into several stages, each of which is carried out while the moving cell cup 5 is within a predetermined sector. These sectors are sometimes referred to hereafter as stations.

FIG. 1 shows the cell cup 5 positioned below nozzle 4. By means of guide ring 6 and lower pressure ram 7, this cell cup is caused to move at the same speed as filler ring 3 and matrix 4. The cell cup in FIG. 1 is shown not yet pushed up against nozzle 4.

As shown in FIG. 2, the cell cup 5 is brought into filling position by raising of lower pressure ram 7. The depth of insertion of the nozzle into the cell cup determines the volume of the depolarizer which will be introduced. By adjustment of the lower ram, this depth of insertion and therefore the volume of the mass can be adjusted. In normal operation, there is within nozzle 4 a cylindrical mass plug 13 of compressed depolarizer mass which remains from the previous pressing operation, and also loosely poured-in depolarizer mass 1. Mass plug 13 prevents the escape of the depolarizer mass while there is no cell cup below the nozzle.

FIG. 3 shows the cell cup at the first pressing station. Prior to pressing, the depolarizer mass moving with the filler ring 3 is formed into a so-called mass cake 15 by means of a fixed leveling board 14.

In what follows, the formation of a depolarizer is described in three compression stages.

In the first stage, a fraction of the mass amounting to about 55 to 75% of the final depolarizer weight is introduced into the cell cup. The upper ram 8 pierces the mass cake 15 and pushes the depolarizer mass, together with mass plug 13, into cell cup 5 until the mass plug is adjacent to the cell cup bottom 50. Thereafter the compression phase itself starts.

To obtain the desired compression pressure, the upper ram 8 is connected to a pressure regulator during the compression phase. The desired value is set by means of a pneumatic pressure device with controllable pressure regulator. In this way, optimum compression density of the depolarizer can be achieved. After compression, ram 8 is returned to its upper position.

FIG. 4 shows a fixed deflector 16, as well as leveling board 14. These push the mass cake laterally into position above the upper end of the nozzle prior to the second compression, thereby filling the void in the mass cake created during the preceding pressure stage. In the second pressing stage, depolarizer mass is again pushed into cell cup 5 through nozzle 4 by means of upper ram 8, and subsequently compressed. The mass portion introduced in the second stage amounts to about 14 to 45% of the depolarizer weight. In the second pressing station, the depolarizer is also compressed to predetermined density by means of a pressure regulator. Following this pressing, ram 8 is returned to its upper position.

FIG. 5 shows the cell cup in the third pressing station. In the third stage there is introduced into the nozzle and the cell cup a mass portion of about 5 to about 16% of the depolarizer weight. This mass introduction corresponds in substance to that in the second pressing station. However, enough mass is introduced so that a portion of the compressed mass remains in nozzle 4 after the pressing process. There is therefore produced a depolarizer press body whose mass amounts to about 120 to 130% of the desired depolarizer weight. Since a predetermined compression has been achieved by means of the pressure regulator, dosage fluctuations manifest themselves through variations in the height of the portion of the depolarizer press body remaining in the nozzle. The pressure regulation always causes the same quantity of depolarizer mass to be pressed into the space between the lower edge 40 of the matrix and cell cup bottom 50, at least to the extent that the depth of insertion of the matrix remains fixed. This depth of insertion is dependent upon the adjustment of lower ram 7. Consequently, the degree of filling of the depolarizer can be adjusted by screw 77 shown in FIG. 1.

To achieve clean separation between the depolarizer press body in the cup and the portion remaining in nozzle 4, cell cup 5 is set into rotation by a friction roller 17, as shown in FIG. 6. Since the nozzle does not rotate, a shearing effect is produced within the depolarizer press body, which leads to separation at the level of the lower rim 40 of the nozzle. So long as the geometrical relationship of nozzle and cell cup remain the same, the depolarizer is always separated at substantially the same place within the cell cup. In this way, a weight uniformity of cells with a tolerance of less than ± 3% is achievable.

As shown in FIG. 7, after the twisting off, the cell cup 5 is pulled away from nozzle 4 by a retractor 18 while the lower ram sinks back to its starting position. The filled cup is then removed from guide ring 6 by a deflector arrangement and a new, empty cell cup is inserted. The portion of the press body separated from the depolarizer electrode remains as a mass plug 13 in the nozzle until it is introduced in the first pressing station into the new, empty cell cup. This mass plug has a weight of about 20 to 30% of the depolarizer electrode.

Figure 8:
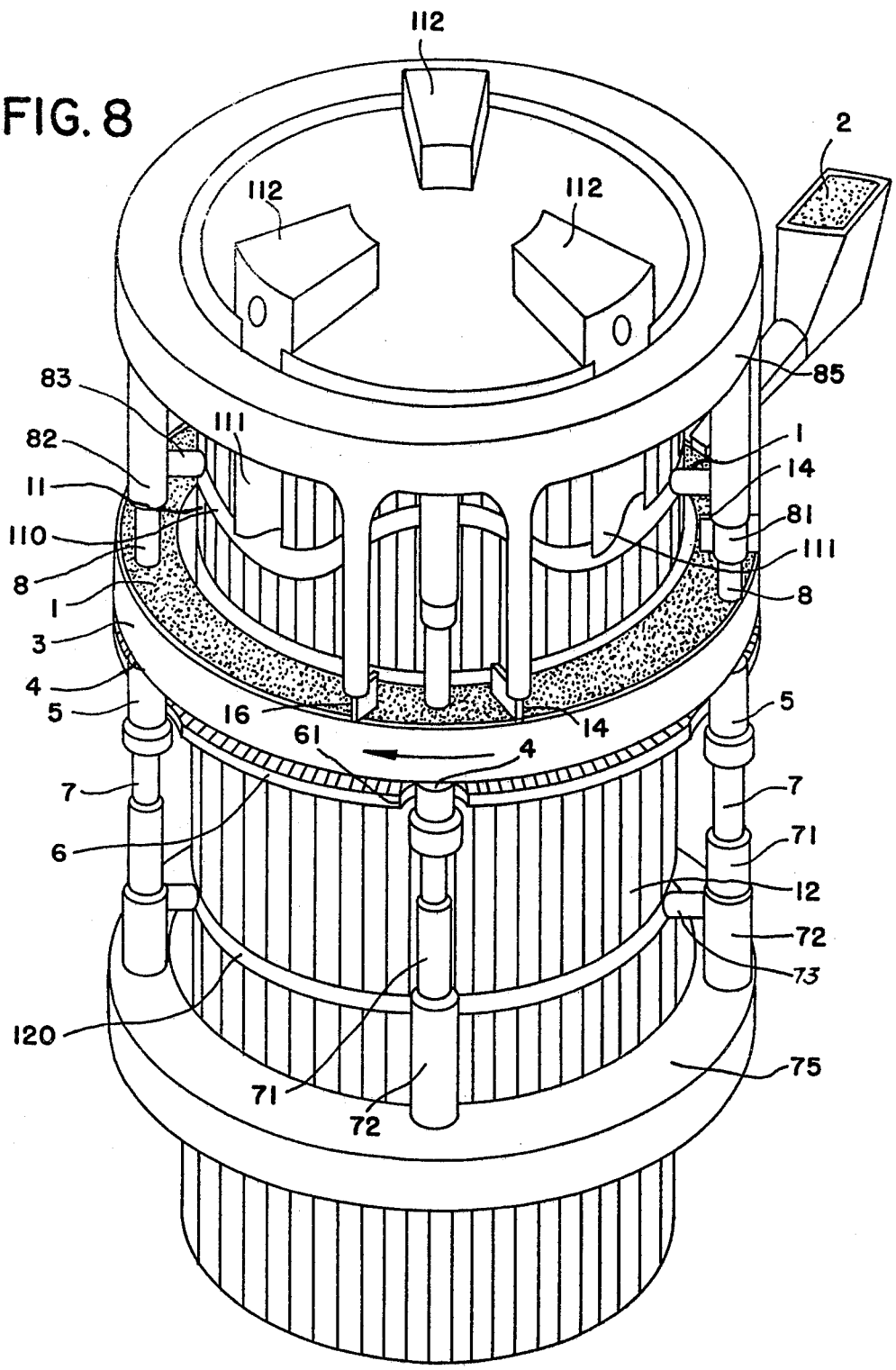
FIG. 8 shows the overall continuous circular arrangement.

FIG. 8 shows the embodiment of the invention as a continuous circulating arrangement. For easier understanding, only three nozzles and their respective rams 7 and 8 are illustrated. The cylindrical housings 11 and 12 equipped with curved guide grooves are fixedly mounted, as are the ram retainer rings 75 and 85. The ram retainer rings serve to guide the rotating hollow cylinders 72 and 82. Filling ring 3, guide ring 6 and rams 7 and 8 rotate at the same rates. Rams 8 are firmly screwed to guide rams 81 which makes the spacing between guide ram 81 and ram 8 adjustable. Guide rams 81 slide within hollow cylinders 82. The arms of upper guide members 83 are connected to guide rams 81 through long slotted apertures in the hollow cylinders. The lower rams 7 are correspondingly screwed to the lower guide rams 71, the latter being slidably positioned within hollow cylinders 72.

By means of a vibratory feed mechanism 2, depolarizer mass 1 is supplied to filler ring 3, which rotates in the direction of the arrow. Filler ring 3 has a U-shaped cross-section. Bymeans of a stationary levelng board 14, the heaped-up mass 1 is formed into a mass cake with level surface. The cups are set into motion by means of rotating guide ring 6 with recesses 61. The cell cups 5 shown in FIG. 8 have already been pushed against the respective nozzles 4 by the lower rams 7.

Before reaching the actual pressing stage, the upper guide members 83 slide from fixed guide curve 110 onto axially displaceable guidance elements 111. These guidance elements are connected with pressure regulators 112, whose desired value is controllable. By adjusting the three pressure regulators 112 to a predetermined desired value, the depolarizer is compressed to the same density at each pressing station.

After pressing, the mass which is now missing from above the nozzle is again leveled out by stationary deflector 16 and smoothed by a leveling board. Leveling boards 14 are respectively positioned in those cylinder segments in which the guide curve has its upward excursion. To illustrate guide curve 110 and guidance elements 111 as clearly as possible, only two leveling boards 14 and one deflector 16 are shown in FIG. 8. It will be understood that in an embodiment of the invention one leveling board and one deflector is provided for each ram.

The number of pressing stages depends on the relationship between diameter and height of the cell cup to be filled. For conventional Mono cells (or D-size batteries), the previously described process using three pressing stages is appropriate, as well as for the conventional Baby cells (or C batteries). For the so-called Mignon cells (or AA batteries) which have a smaller relationship between diameter and height, a greater number of pressing stages, such as six, is desirable in order to achieve a satisfactory and uniform density of the depolarizer press body. By increasing the number of pressing stages, the production rate of the system is not appreciably reduced.

The technique described it possible to achieve extraordinary high production rates, not obtainable by conventional methods, while the weight tolerance of the depolarizer can be kept within very narrow limits. Since the density of the depolarizer mass within the cell cup can be kept constant, it is also possible to adapt the depolarizer mass itself optimally to the electrical requirements of the cell. In accordance with the invention the density of the depolarizer mass produced within the cell cup can be adjusted within wide limits by a simple adjustment of the desired value of the pressure regulator.

A preferred arrangement for producing the desired pressure regulation is illustrated in FIG. 9, to which reference may now be had.

This FIG. 9 illustrates diagrammatically one form which can be taken by the pressure regulators 112 of FIG. 8 and the actuating elements associated therewith.

Each pressure regulator 112 comprises a cylinder 112a having a piston 114 and a piston rod 112b connected to the top of its associated guidance element 111, in order to impart to that element the desired axial displacements with respect to guide curve 110.

The position of piston 114 and piston rod 112b is determined by the pressure within the upper portion 115 of cylinder 112a. Valve 116 is connected in the inlet line of cylinder 112a to control that pressure. Valve 116 is solenoid operated in response to a suitable electrical control signal. Valve 116 receives its compressed air from reservoir 117, whose input is, in turn, supplied via precision pressure control 118, pressure control unit 119, which serves to disconnect the machine if a given minimum pressure is attained, service unit 109 consisting of filter, pressure regulator and lubricator and supply valve 108. 112c and 116b are exhaust ports with silencers. This pneumatic system operating with compressed air may be replaced by a hydraulic system.

Different depths of mass insertion under pressure are to be accomplished at the different pressing stations. For example, in the first pressing station, the cup may be filled to the level indicated by reference numeral 101 in FIG. 9. In the second station the cell cup is then filled further to level 102 and in the third to level 103. The purpose of the pressure regulator is to fill the cup with depolarizer mass at constant pressure, despite the different insertion depths. If, for example, cell cup 5 is filled in three successive pressing stages, then the upper guide member 83 is subjected consecutively to guidance from above by means of three displaceable guidance elements 111. In each case the point of lowest displacement is different for the respective individual pressing operation. Guide member 83 is illustrated in FIG. 9 at approximately this point of lowest displacement at one typical pressing station.

When the machine stops, the pressure system is vented, in order to forestall electrolyte escape from the mass. The pressure reservoir 117 assures constant pressure, even if the pressure system is repeatedly turned off and on.

A particular advantage of the system described resides in the following. Simple adjustments in the electrical signal applied to each valve 116 can be used to adjust the respective pressure regulator 112 to that particular condition in which it produces the desired compression (i.e., predetermined weight) of mass being pressed into the cell cup at the pressing stage controlled thereby.

I claim:

1. In the method of producing galvanic cells having cell cups which contain a predetermined quantity of depolarizer mass compressed to within narrow tolerances of density and conforming to electrochemical conditions, which method includes engaging a cell cup with a nozzle, and utilizing a ram to press the depolarizer mass through the nozzle into the cup, the improvement which comprises:
    performing a stroke of the ram through the nozzle to introduce into the cup a first dose of depolarizer mass which is less than the predetermined quantity, and pressing that first dose into the bottom of the cup,
    performing at least one subsequent stroke of a ram into the nozzle, each subsequent stroke introducing into the cup and additional dose of the depolarizer mass, which is also less than the predetermined quantity, and pressing that additional dose into the cup,
    continuing the subsequent strokes of a ram and pressing of the mass until the first such stroke which presses a dose that more than fills the cup and extends back into the nozzle, and
    then separating the cup from the nozzle.

2. The method of claim 1 further comprising disengaging the cup from the nozzle so as to leave in the nozzle the portion of the mass which extends back into the nozzle and removing the cup.

3. The method of claim 2 wherein the portion left in the nozzle is between about 20 and about 30 percent of the predetermined quantity.

4. The method of claim 1 wherein the number of strokes is at least three.

5. The method of claim 1 wherein the number of strokes is at least six.

6. The method of claim 1 which comprises moving the nozzle and engaged cup from one work station to another between strokes.

7. The method of claim 1 which comprises regulating the pressure in each stroke.

8. The method of claim 2 wherein the disengaging includes rotating the cell cup relative to the nozzle so as to sever the portion of the mass which extends back into the nozzle from that in the cup.

9. The method of claim 2 further comprising engaging a second cell cup with the nozzle, and repeating the steps.

10. The method of claim 9 wherein the dose introduced into the second cell cup in the first ram stroke includes the portion of the mass which is left in the nozzle from the last prior stroke.

11. The method of claim 6 which comprises positioning different nozzles engaging different cell cups at the different work stations.

12. The method of claim 11 which comprises performing ram strokes independently at the different work stations.

13. The method of claim 9 wherein there are three strokes for each cup and the dose pressed in the first stroke is between about 55 and about 75 percent of the predetermined quantity.

14. The method of claim 13 wherein the dose pressed in the second stroke is between about 14 and about 25 percent of the predetermined quantity.

15. The method of claim 14 wherein the dose pressed in the third stroke is between about 5 and about 16 percent of the predetermined quantity.

16. The method of claim 12 which comprises regulating the pressure in each stroke at each work station.

17. The method of claim 10 wherein the dose introduced into the second cell cup in the first ram stroke also comprises additonal depolarizer mass not left in the nozzle from the last prior stroke.

18. In a system for fillng galvanic cell cups with a predetermined quantity of depolarizer mass compressed to within narrow tolerances of density and conforming to electrochemical conditions, which system includes at least one nozzle with which different cell cups are adapted to be brought serially into engagement, and ram means for performing strokes which press depolarizer mass through the nozzle into the engaged cell cup, the improvement which comprises:
    means for controlling the first of the strokes performed during engagement of a nozzle by a cup to introduce into the cup a first dose of depolarizer mass which is less than the predetermined quantity and pressing that first dose into the bottom of the cup,
    means for controlling subsequent strokes performed during engagement of the same nozzle by the same cup to introduce into the cup in each subsequent stroke and additional dose of the depolarizer mass which is also less than the predetermined quantity and pressing that additional dose into the cup, until a dose more than fills the cup and extends back into the nozzle, and means for maintaining the cup in engagement with the nozzle during the first and subsequent strokes.

19. The system of claim 18 wherein the nozzle is positioned pointing generally vertically downward, and means are provided for pushing the cell cups serially upward into engagement with the nozzle.

20. The system of claim 19 wherein the ram means comprises a ram vertically reciprocable into and out of the top of the nozzle, and further comprising mass supply means including a mass container positioned above the nozzle for traversal by the reciprocating ram.

21. The system of claim 20 further comprising means for coordinating the movements of said upward pushing means and said recprocable ram to maintain each cell cup in engagement with one nozzle during a plurality of ram compression strokes.

22. The system of claim 21 wherein the coordinating means comprises a first stationary guidance track, and means engaging said track and guided thereby for controlling the ram stroke.

23. The system of claim 22 further comprising a second stationary guidance track and means engaging said track and guided thereby for controlling the upward pushing.

24. The system of claim 23 comprising a stationary cylinder provided with annular grooves forming the guidance tracks.

25. The system of claim 24 wherein a plurality of nozzles and cooperating upward pushing means and reciprocable rams are positioned rotatably around the periphery of the cylinder.

26. The system of claim 25 wherein the annular grooves are so configured that successive compression strokes of any one ram take place at different positions around the cylinder periphery.

27. The system of claim 24 further comprising pressure regulating means for the ram compression strokes.

28. The system of claim 27 wherein the pressure regulating means comprises means for adjusting the ram stroke guidance track.

29. The system of claim 27 wherein the track adjusting means comprises means axially slidable with respect to the first guidance track to control the ram stroke at the compression stroke positions.

30. The system of claim 29 wherein the pressure regulating means comprises an air pressure activated means for controlling the axial position of the slidable means.

31. The system of claim 30 wherein the regulating means comprises means responsive to an electrical control signal to activate the pressure fluid means.

* * * * *